United States Patent [19]

Fimeri

[11] Patent Number: 4,836,491
[45] Date of Patent: Jun. 6, 1989

[54] BREAKAWAY MIRROR SPRING MEANS

[75] Inventor: Garry G. L. Fimeri, Lonsdale, Australia

[73] Assignee: Britax Rainsfords, Pty. Ltd., Lonsdale, Australia

[21] Appl. No.: 190,012

[22] Filed: May 4, 1988

[30] Foreign Application Priority Data

May 4, 1987 [AU] Australia ................................ PI1723

[51] Int. Cl.⁴ .............................................. G02B 7/18
[52] U.S. Cl. .................................. 248/549; 248/481; 350/635
[58] Field of Search ............... 248/548, 549, 610, 466, 248/475.1, 476, 479, 481, 483, 487, 900; 350/631, 632, 635, 636, 640, 604; 40/602, 608; 16/281, 285, 284; 404/10

[56] References Cited

U.S. PATENT DOCUMENTS

| | | | |
|---|---|---|---|
| 3,485,201 | 12/1969 | Kelley | 404/10 |
| 4,268,122 | 5/1981 | Deshaw | 248/900 |
| 4,422,724 | 12/1983 | Otsuka | 248/900 |
| 4,548,483 | 10/1985 | Moro | 248/549 |
| 4,679,758 | 7/1987 | Boddy | 248/479 |
| 4,740,066 | 4/1988 | Whitehead | 248/900 |
| 4,755,033 | 7/1988 | Whitehead | 248/549 |

FOREIGN PATENT DOCUMENTS

| | | | |
|---|---|---|---|
| 113446 | 8/1965 | Denmark | 404/10 |
| 3220893 | 12/1983 | Fed. Rep. of Germany | 350/650 |

Primary Examiner—Alvin C. Chin-Shue
Assistant Examiner—Robert A. Olson
Attorney, Agent, or Firm—Klauber & Jackson

[57] ABSTRACT

A breakaway rear vision mirror assembly having a mounting frame and a pivoted assembly which carries the mirror, the pivoted assembly being coupled to the mounting frame by means of an elongate U-shaped spring, the ends of which are coupled to the mounting frame and an intermediate portion which bears on the pivoted assembly to return the pivoted assembly to a usable position after it has been deflected.

6 Claims, 2 Drawing Sheets

BREAKAWAY MIRROR SPRING MEANS

This invention relates to a "breakaway" type rear vision mirror assembly which is useful for mounting exteriorly on a vehicle panel, and which has a facility that it will "break away" if deflected either forwardly or rearwardly, but return to its original usable position.

BACKGROUND OF THE INVENTION

Such mirrors are in common use, but sometimes suffer with the disability that the spring rate is such that the members disengage and require a re-engagement operation which is difficult to achieve. Under extreme impact conditions, it is possible for a spring (in a prior art mirror) to be stretched beyond its elastic limit and become useless.

The main object of this invention is to provide improvements wherein the difference in pressure applied by the spring during deflection will be less than the difference with a spring arrangement as presently used, that is, the spring rate will be improved in that it will be lower, and wherein the cost of manufacture can be reduced.

BRIEF SUMMARY OF THE INVENTION

In this invention there is provided a breakaway rear vision mirror assembly having a mounting frame and a pivoted assembly which carries the mirror, the pivoted assembly being coupled to the mounting frame by means of an elongate U-shaped spring, the ends of which are coupled to the mounting frame and an intermediate portion which bears on the pivoted assembly to return the pivoted assembly to a usable position after it has been deflected.

More specifically, the invention consists of a breakaway rear vision mirror assembly of the type having a mounting base and a pivoted assembly pivoted thereto to allow displacement of the mirror assembly both forwardly and rearwardly, a mirror carried by the pivoted assembly, walls defining a spring track of general 'U'-shape in the pivoted assembly, a spring contained within the spring track, the spring having two ends extending from the spring track and coupled to the mounting base and an intermediate portion bearing against the spring track walls to return the pivoted assembly to a usable position after said displacement either forwardly or rearwardly, and a mirror mounting plate carrying the mirror and having a first element of a ball-and-socket joint extending from its rear surface, and the pivoted assembly comprising a cover, a second element of the ball-and-socket joint extending from the cover and engaged by the first element, the spring track extending part way around the ball.

BRIEF DESCRIPTION OF THE DRAWINGS

An embodiment of the invention is described hereunder in some detail with reference to and is illustrated in the accompanying drawings in which.

DETAILED DESCRIPTION OF THE PREFERRED EMBODIMENT

Figure 1:
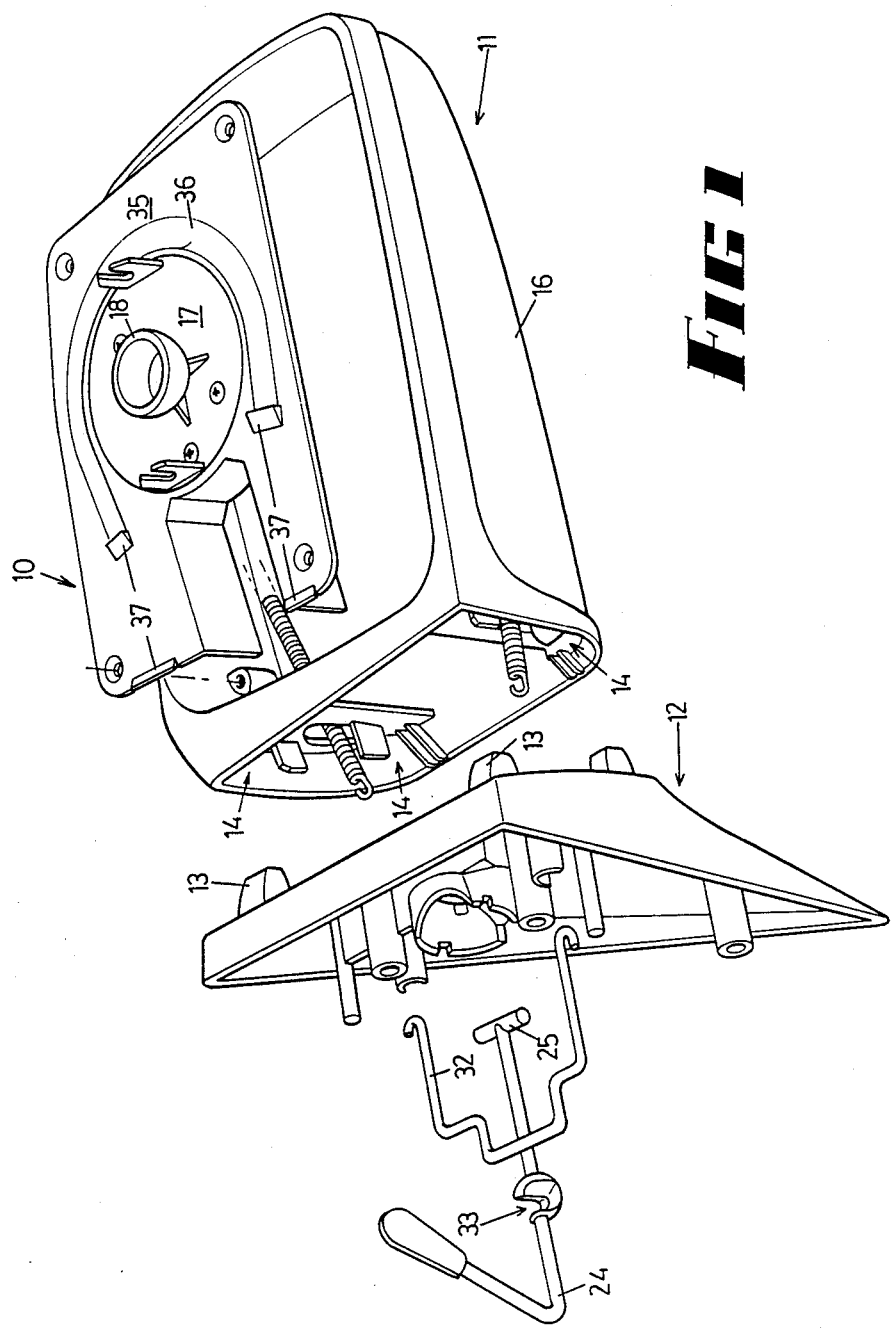
FIG. 1 is an "exploded" perspective view of a rear vision mirror assembly.
Figure 3:
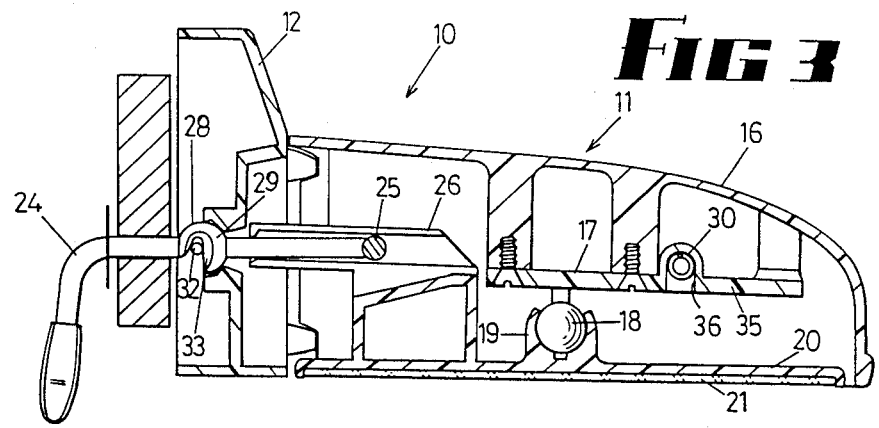
FIG. 3 is a plan section taken on line 3—3 of FIG.
Figure 2:
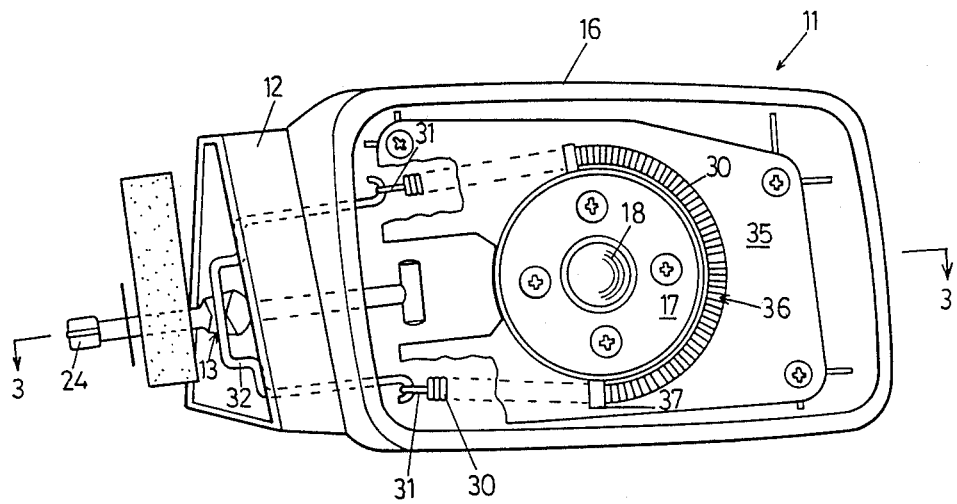
FIG. 2 is a front elevation of a breakaway mirror.

In this embodiment, a breakaway rear vision mirror assembly 10 comprises a pivoted assembly 11 and a mounting base 12. The two are interconnected by releasable spigot and socket means comprising four spigots 13 which project from the base 12, and at least three sockets 14 (or their mechanical equivalents) in the pivoted assembly.

The pivoted assembly 11 comprises a cover 16 which carries a swivel mount plate 17 from which projects a ball 18 which is engaged by claws 19 which extend inwardly from a mirror mounting plate 20 carrying a mirror 21. The ball 18 and claws 19 comprise a ball-and-socket connection whereby the mirror can swivel about both vertical and horizontal axes.

There is provided a tilt control lever 24 which extends inwardly into the pivoted assembly 11 from the base 12, and has a T-head 25 which engages in the recesses of a channel track 26, such that movement of the lever 24 effects the required tilting action, and correct assembly of the base 12 and pivoted assembly 11 is retained during "breakaway" displacement.

The lever 24 is provided with a lever ball 28 which bears against the part-spherical socket walls 29 on portion of the mounting base 12, and is retained in frictional engagement therewith by means of an elongate spring 30.

The ends 31 of the spring 30 project and engage over hook ends of a saddle 32 which passes through an opening 33 in the ball 28, so that the spring 30 both pulls the pivoted assembly 11 into engagement with the mounting base 12 and also pulls the ball 28 into a frictional engagement with the socket walls 29.

In order to retain the spring 30 so that its intermediate portion bears against the pivoted assembly 11, the pivoted assembly 11 comprises a spring plate 35 having walls defining a spring track 36 of general 'U' shape which partly contains the spring 30 which bears against the slot walls. With this arrangement the effective length of the spring 30 is greater than prior art springs. The curved portion of slot 36 terminates beneath portion of spring plate 35, and short "lead-in" ramps 37 are provided in the spring plate to ensure free passage of spring 30 during "breakaway" displacement and return of the pivoted assembly to a usable position.

This feature is one of importance for the reason that, if the spring rate is high, the spring force greatly increases upon deflection, and shattering of the mirror or parts of the assembly can occur under high impact conditions. However this arrangement provides a means whereby likelihood of such shattering is largely reduced due to a much lower spring rate. Assembly is quickly and easily effected, and the spring causes pressure to be applied between the lever ball 28 and its socket walls 29.

The claims defining the invention are as follows:

1. A breakaway rear vision mirror assembly of the type having a mounting base and a pivoted assembly thereto to allow displacement of the mirror assembly both forwardly and rearwardly, a mirror carried by the pivoted assembly, walls defining a spring track of general 'U'-shape in the pivoted assembly, a spring contained within the spring track, the spring having two ends extending from the spring track and coupled to the mounting base and an intermediate portion bearing against the spring track walls to return the pivoted assembly to a usable position after said displacement either forwardly or rearwardly, and a mirror mounting plate carrying said mirror and having a first element of a ball-and-socket joint extending from its rear surface, and said pivoted assembly comprising a cover, a second element of said ball-and-socket joint extending from said cover and engaged by said first element, said spring track extending part way around the ball.

2. A breakaway rear vision mirror assembly according to claim 1 wherein said first element of said ball-and-socket joint comprises claws which frictionally engage the said second element which comprises a ball.

3. A breakaway rear vision mirror assembly according to claim 1 comprising a spring plate, said spring track being in the spring plate and partly surrounding the ball-and-socket joint.

4. A breakaway rear vision mirror assembly according to claim 1 further comprising a spring plate, said spring track extending along each side of and partly surrounding the ball-and-socket joint, and terminating beneath portions of said spring plate, the spring plate having "lead-in" ramps which guide the spring in its movement beneath said side portions of said plate.

5. A breakaway rear vision mirror assembly according to claim 1 further comprising a tilt control lever carried by and movable in the mounting base, and a saddle extending through said tilt control lever, said spring ends engaging the saddle and urging the tilt control lever into frictional engagement with said mounting base.

6. A breakaway rear vision mirror assembly of the type having a mounting base and a pivoted assembly pivoted thereto to allow displacement of the mirror assembly both forwardly and rearwardly, a mirror carried by the pivoted assembly, walls defining a spring track of general 'U'-shape in the pivoted assembly, and a spring contained within the spring track, the spring having two ends extending from the spring track and coupled to the mounting base and an intermediate portion bearing against the spring track walls to return the pivoted assembly to a usable position after said displacement either forwardly or rearwardly, and a tilt control lever carried by and movable in the mounting base, and a saddle extending through said tilt control lever, said spring ends engaging the saddle and urging the tilt control lever into frictional engagement with said mounting base.

* * * * *